United States Patent [19]
Go

[11] Patent Number: 5,963,875
[45] Date of Patent: Oct. 5, 1999

[54] AUTOMATIC DIALING METHOD OF MOBILE TELEPHONE USING ABBREVIATED OR FULL NUMBER FORMAT

[75] Inventor: Sung-Jin Go, Gumi, Rep. of Korea

[73] Assignee: SamSung Electronics Co., Ltd., Kyungki-do, Rep. of Korea

[21] Appl. No.: 08/654,430

[22] Filed: May 28, 1996

[30] Foreign Application Priority Data

May 27, 1995 [KR] Rep. of Korea ............ 95-13560

[51] Int. Cl.⁶ ...................................... H04Q 7/32
[52] U.S. Cl. ................ 455/564; 455/565; 379/355
[58] Field of Search ...................... 455/564, 565, 455/557, 74.1; 379/354–356

[56] References Cited

U.S. PATENT DOCUMENTS

| | | | |
|---|---|---|---|
| 4,736,410 | 4/1988 | Nishida et al. | 379/354 |
| 4,737,975 | 4/1988 | Shafer | 379/58 |
| 4,959,851 | 9/1990 | Tobolski, Jr. et al. | 379/59 |
| 5,117,450 | 5/1992 | Joglekar et al. | 379/58 |
| 5,131,029 | 7/1992 | Kunstadt . | |
| 5,247,565 | 9/1993 | Joglekar et al. | 379/58 |
| 5,267,308 | 11/1993 | Jokinen et al. . | |
| 5,305,372 | 4/1994 | Tomiyori . | |
| 5,349,629 | 9/1994 | Kumano . | |
| 5,384,825 | 1/1995 | Dillard et al. . | |
| 5,402,481 | 3/1995 | Waldman . | |
| 5,487,108 | 1/1996 | Atkins et al. . | |
| 5,491,745 | 2/1996 | Roeder | 379/355 |
| 5,493,604 | 2/1996 | Hirayama . | |
| 5,535,260 | 7/1996 | Zicker et al. | 379/63 |
| 5,722,087 | 2/1998 | Ala-Mursula et al. | 455/564 |

FOREIGN PATENT DOCUMENTS

| | | |
|---|---|---|
| 2182600 | 9/1994 | Canada . |
| 2032163 | 11/1994 | Canada . |
| 2042305 | 3/1995 | Canada . |

*Primary Examiner*—Edward F. Urban
*Attorney, Agent, or Firm*—Robert E. Bushnell

[57] ABSTRACT

An automatic dialing method of a mobile telephone system linked to a mobile telephone network including a first memory and a second memory storing pre-registered telephone numbers of selected subscribers and abbreviated numbers corresponding to the telephone numbers. The automatic dialing method requires determining whether one of a telephone number of a called subscriber and an abbreviated number corresponding to the telephone number is entered by an operator; sequentially storing the telephone number of the called subscriber in the first memory as each digit of the telephone number is being entered by the operator; determining whether a predetermined time period has expired after all digits of the telephone number have been entered by the operator and sequentially stored in the first memory; and automatically dialing the telephone number of the called subscriber for establishing a connection to the mobile telephone network upon expiration of the predetermined time period.

20 Claims, 4 Drawing Sheets

AUTOMATIC DIALING METHOD OF MOBILE TELEPHONE USING ABBREVIATED OR FULL NUMBER FORMAT

CROSS-REFERENCE TO RELATED APPLICATION

This application makes reference to, incorporates the same herein, and claims all benefits accruing under 35 U.S.C. §119 from an application for Dialing Method Of Mobile Telephone earlier filed in the Korean Industrial Property Office on May 27, 1995 and there duly assigned Serial No. 13560/1995.

BACKGROUND OF THE INVENTION

1. Technical Field

The present invention relates to a method for controlling a telephone conversation in a radio mobile telephone, and more particularly, to a method capable of automatically dialing input telephone numbers.

2. Background Art

Generally, conventional radio mobile telephone systems include portable telephones and radio telephones for use in vehicles. A basic radio mobile telephone system usually consists of three parts: a mobile telephone unit, a cell site, and a mobile telephone switching office (MTSO) with connections to link the three subsystems. The mobile telephone unit contains a controller, a transceiver, and an antenna system. The cell site provides interface between the MTSO and the mobile telephone units. The MTSO which is the central coordinating element for all cell sites, contains the cellular processor and cellular switch. The MTSO interfaces with telephone company zone offices, controls call processing, and handles billing activities. The radio and high-speed data links connect the three subsystems. Each mobile telephone unit can use only one channel at a time for its communication link, but the channel is not fixed; it can be any channel in the entire band of channels assigned by the serving area, with each cell site having multichannel capabilities that can connect simultaneously to many mobile telephone units.

The MTSO is the heart of the cellular mobile system. Its cellular switch, which can be either analog or digital, switches calls to connect mobile subscribers to other mobile subscribers and to the nationwide telephone network. The radio link carries the voice and signaling between the mobile unit and the cell site. The high-speed data links, however, can not be transmitted over the standard telephone trunks and therefore must use either microwave links or wire lines. Microwave radio links or wire lines carry both voice and data between the cell site and the MTSO.

The mobile telephone unit, as described above, generally contains a controller, a transceiver, and an antenna system. The transceiver includes a frequency synthesizer to establish a radio channel with a nearby base station located in a cell site of the mobile telephone system in a manner well known in the art under the control of the controller. An audio circuit is also used for coupling a speaker and a microphone to the transceiver when the connection is established with the base station located in the cell site. A telephone keypad is also provided to allow an operator to dial a telephone number requesting connection with the base station. The telephone keypad typically contains a series of keys or push buttons designated as "1" to "0" and a "*" and a "#" key. For visually assisting an operator to enter digits for the purpose of dialing a telephone number of a called subscriber, a display unit is connected to the controller to display dialing and other information on the cellular phone.

When a telephone call is desired, an operator must first enter a telephone number of a called subscriber through the keypad. Once the telephone number and its corresponding digit number is stored in a memory and displayed through the display unit, the operator is then required to press a "SEND" key after the telephone number of a called subscriber has been dialed in order to transmit such a telephone number to the telephone network and to inform the network that a connection is desired. There are known dialing features that may be incorporated into such a conventional mobile telephone system in order to simplify a dialing operation such as an automatic dialing technique disclosed, for example, in U.S. Pat. No. 5,493,604 for Portable Telephone Set With Automatic Dialing Feature issued to Hirayama, a speed dialing technique disclosed, for example, in U.S. Pat. No. 5,349,629 for Portable Telephone With Speed Dialing issued to Kumano, U.S. Pat. No. 5,305,372 for Mobile Unit With Speed Dialing Feature For Cellular Telephone Network issued to Tomiyori, and U.S. Pat. No. 5,267,308 for Speed Dialing Method For A Telephone Unit issued to Jokinen et al., and a memory enhanced dialing technique disclosed, for example in U.S. Pat. No. 5,402,481 for Abbreviated And Enhanced Dialing Apparatus And Methods Particularly Adapted Cellular Or Other Types Of Telephone Systems issued to Waldman and U.S. Pat. No. 5,384,825 for Method For Memory Dialing For Cellular Telephones issued to Dillard et al. I have observed that even if any one of these enhanced dialing techniques is incorporated into a typical mobile telephone unit, when a telephone number is dialed in its abbreviated form, whether for speed dialing or memory dialing, an operator is still required to press a "SEND" for transmission to the telephone network in order to inform the network that a connection is desired. This manual requirement can be cumbersome, and consequently further improvement can be contemplated.

SUMMARY OF THE INVENTION

Accordingly, it is therefore an object of the present invention to provide a mobile telephone system with an automatic dialing feature.

It is also an object to provide a mobile telephone system capable of automatically dialing a telephone number of a called subscriber.

It is further an object to provide a mobile telephone system capable of automatically dialing a telephone number of a called subscriber upon request of an operator in either its abbreviated number format or its full number format.

These and other objects of the present invention can be achieved with an automatic dialing feature of a mobile telephone system linked to a mobile telephone network including a first memory and a second memory storing pre-registered telephone numbers of selected subscribers and abbreviated numbers corresponding to the telephone numbers. This automatic dialing feature requires determining whether one of a telephone number of a called subscriber and an abbreviated number corresponding to the telephone number is entered by an operator; sequentially storing the telephone number of the called subscriber in the first memory as each digit of the telephone number is being entered by the operator; determining whether a predetermined time period has expired after all digits of the telephone number have been entered by the operator and sequentially stored in the first memory; and automatically dialing the telephone number of the called subscriber for establishing a connection to the mobile telephone network upon expiration of the predetermined time period.

The automatic dialing feature as contemplated by the present invention also allows the storage of the abbreviated number corresponding to the telephone number of the called subscriber, when the abbreviated number corresponding to the telephone number has been entered by the operator; determining whether the predetermined time period has expired after all digits of the abbreviated number have been stored in the first memory; and accessing the second memory to reproduce the telephone number of the called subscriber corresponding to the abbreviated number stored in the first memory, and automatically dialing the telephone number of the called subscriber for establishing a connection to the mobile telephone network upon expiration of the predetermined time period.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
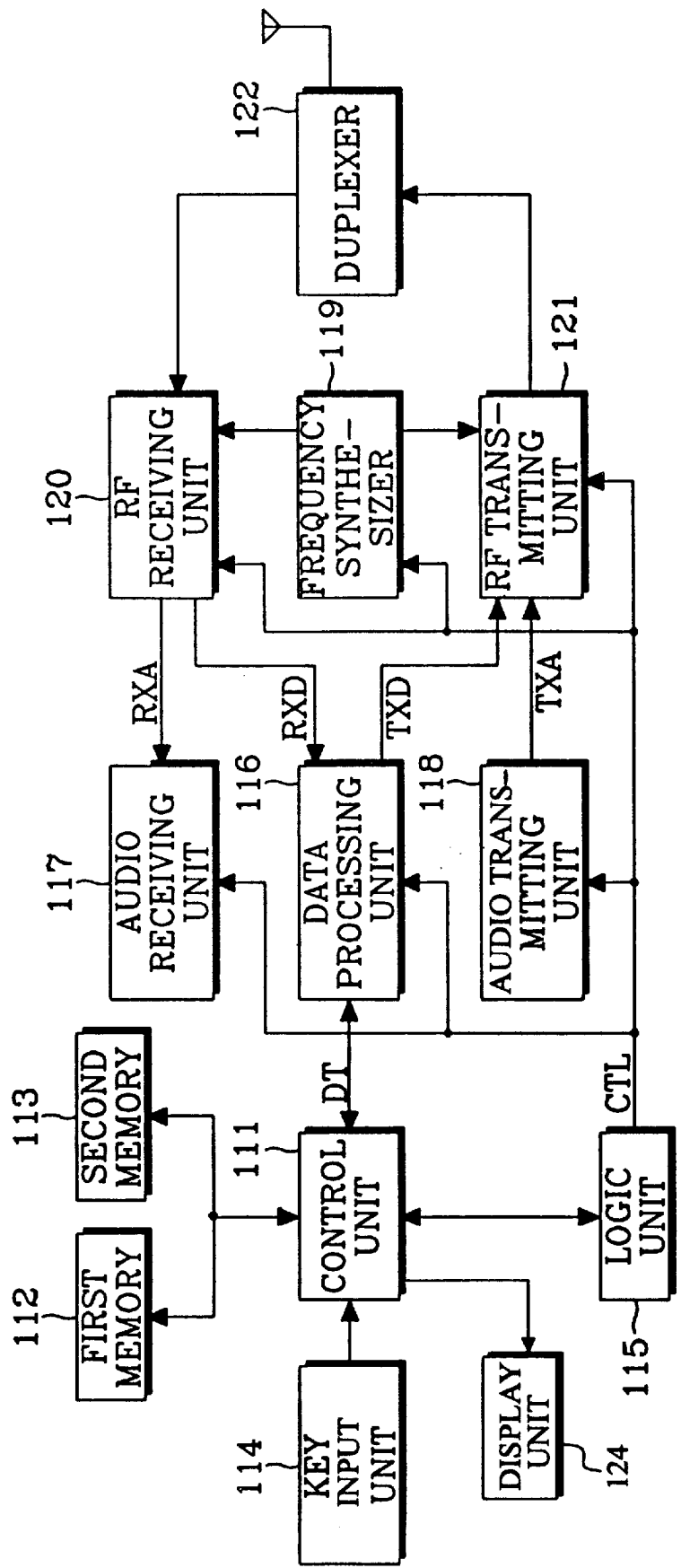
FIG. 1 illustrates an abstract representation of the construction of a hypothetical typical mobile telephone unit for a mobile telephone system.

Referring now to the drawings and particularly to FIG. 1, which illustrates a typical radio mobile telephone system. The radio mobile telephone system of FIG. 1 illustrates a control unit 111 for controlling overall operation of the radio mobile telephone system. A first memory 112 may be constructed with an electrically erasable and programmable read-only-memory (EEPROM), and stores an application program and initial service data. A second memory 113 may be constructed with a random-access-memory (RAM), and temporarily stores data generated during operation of the radio mobile telephone. A key input unit 114 generates key data to the control unit 111 for executing various control modes and dialing operation of the radio mobile telephone. A logic unit 115 is connected to the control unit 111 for controlling the control unit 111, and for generating control data CTL to control operation of each unit of the radio mobile telephone. A data processing unit 116 communicates with the control unit 111 for processing reception data RXD received from a RF receiving unit 120, applying processed information data DT to the control unit 111 and generating transmission data TXD to a RF transmitting unit 121 for subsequent transmission via an antenna. The data processing unit 116 as contemplated by the present invention may be constructed with a digital signal processor.

A duplexer 122 is connected to an antenna for performing a dual function, that is, to enable reception and transmission of a RF signal. A RF receiving unit 120 is connected to the duplexer 122 for receiving the RF signal and demodulating the received RF signal to separate an audio reception signal RXA and information data RXD therefrom. An audio receiving unit 117 is connected to the RF receiving unit 120 for receiving the audio signal for an audio output via a speaker (not shown) under control of the control data CTL generated from the logic unit 115. An audio transmitting unit 118, on the other hand, receives an audio output from the speaker for audio processing to generate an audio transmission signal TXA. The RF transmitting unit 121 is connected to the data processing unit 116 and the audio transmitting unit 118 for modulating the transmission data TXD and the audio transmission signal TXA into a transmission format under the control of the control data CTL generated from the logic unit 115, and for generating a modulated signal to the duplexer 122. A frequency synthesizer 119 is connected to the RF receiving unit 120 and the RF transmitting unit 121 for synthesizing the frequency to establish a reception channel of the RF receiving unit 120 and a transmission channel of the RF transmitting unit 121 with a nearby base station located in a cell site of a mobile telephone network according to control data of the logic unit 115. A display unit 124 is connected to the control unit 111 for providing a visual display of the dialing and other information on the mobile telephone system.

Figure 2:
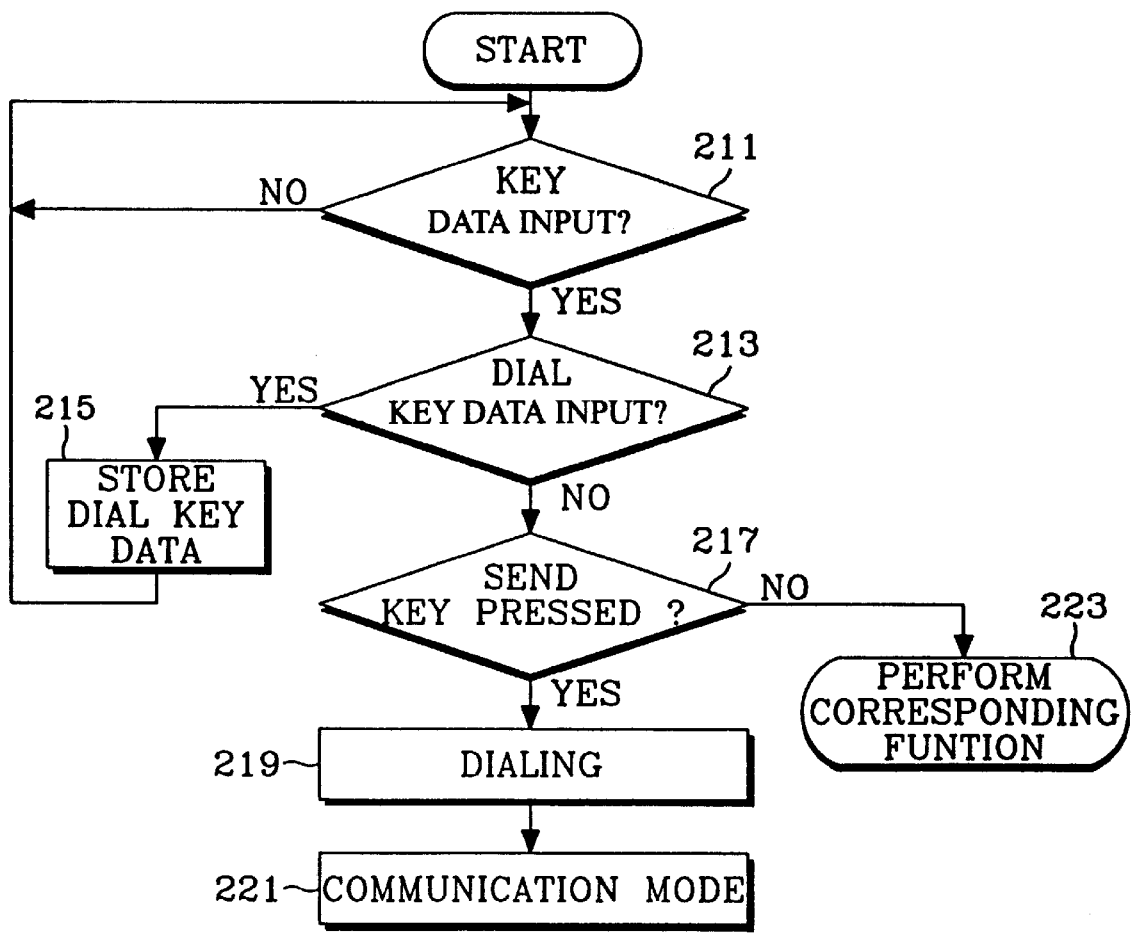
FIG. 2 is a flowchart illustrating a conventional dialing operation of the mobile telephone unit.

FIG. 2 illustrates a conventional dialing operation of the radio mobile telephone system of FIG. 1. Under normal operation, the control unit 111 scans the key input unit 114 to detect whether key data is input by an operator. If key data is received from the key input unit 114, the control unit 111 senses the input of the key data and analyzes the input key data at step 211. If the input key data represents a numeric key, the control unit 111 senses that dial key data is input at step 213, and proceeds to store input key data in the second memory 113 at step 215. Once the input dial key data is stored in the second memory 113, the control unit 111 returns to scan the key input unit 114 for the next key data input by the operator. While repeating the operation as described above, the control unit 111 receives dial key data corresponding to a telephone number of a called subscriber, and stores received key data in the second memory 113. After the telephone number of the called party is entered and temporarily stored in the second memory 113, the control unit 111 scans the key input unit 114 to determine whether the next key data input represents "SEND" key data at step 217. Once the "SEND" key is pressed by an operator at step 217, the control unit 111 forwards the dial key data representing a telephone number of the called party stored in the second memory 113 to the data processing unit 116. The data processing unit 116 then processes telephone number data for transmission to the RF transmitting unit 121, and the RF transmitting unit 121 modulates the telephone number data to form a RF signal for transmission via an antenna. After that, the control unit 111 executes a communication mode at step 221, and if the called party responds, a speech path is formed.

As established earlier, in order for the conventional radio mobile telephone to complete the dialing operation, an operator is required to press a "SEND" key for transmission after the called party's telephone number is dialed. This manual requirement, as I have observed, can be cumbersome.

Figure 3:
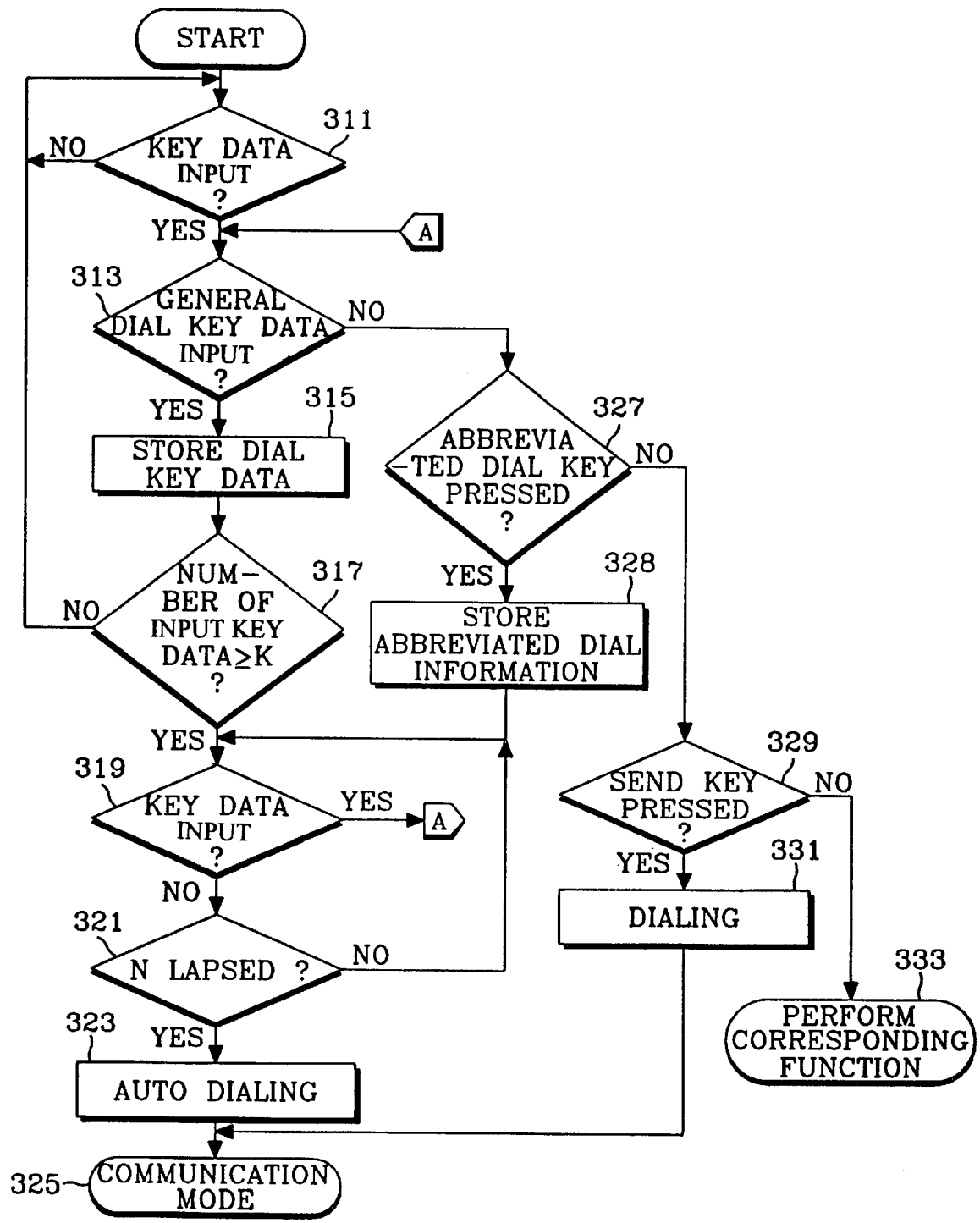
FIG. 3 is a flowchart illustrating a dialing operation of the mobile telephone unit constructed as a first embodiment of the present invention.

Turning now to FIG. 3, which illustrates an automatic dialing operation of a mobile telephone system performed in accordance with a first embodiment of the present invention. The automatic dialing operation includes determining whether key data is input through a key input unit by an operator. The input key data is then analyzed to determine whether the input key data represents general dial key data. If the number of the input key data is less than a designated number of the telephone number, additional key data entry is required until all the digits corresponding to the telephone number of a called subscriber are entered by the operator and sequentially stored in a memory. Once all the digits represented by the input key data are entered and sequentially stored in the memory, the telephone number of the called subscriber is automatically dialed after a predetermined time period elapses with no further key data entry having been made. In addition, the telephone number of the called subscriber can also be recalled by an abbreviated dial key for an automatic dialing also after expiration of the same predetermined time period.

The automatic dialing operation of FIG. 3 will now be described with reference to the mobile telephone unit of FIG. 1 as follows. The control unit 111 scans the key input unit 114 to detect whether key data is input by an operator. If key data is received from the key input unit 114, the control unit 111 senses input of key data at step 311 in order to analyze input key data. At this point, if an analyzed result indicates that the key data input is for executing a general dial mode, the control unit 111 senses input of general dial key data at step 313, and stores input dial data in a dial buffer of the second memory 113 at step 315. Then, in the general dial mode, the telephone number is input by using the numeric key, and the control unit 111 repeats the steps as described previously in order to store numeric key data of the received telephone number in the second memory 113.

After storing numeric key data of the input telephone number in the dial buffer of the second memory 113, the control unit 111 detects whether the number of digits of the telephone number stored in the dial buffer reaches a designated number K or more at step 317 step. The existing telephone communication pattern can be largely classified into a local area call, a long distance call, an international call and so on. Accordingly, there are at least three types of telephone number formulas. The first telephone number formula involves local area calls in which the telephone number of a called subscriber has to contain an office number and a subscriber's number. The second telephone number formula involves long distance calls in which the telephone number of a called subscriber has to contain an area code, the office number and the subscriber's number. Finally, the third telephone number formula involves international calls in which the telephone number of a called subscriber has to include a country code, the area code, the office number and the subscriber's number. Therefore, the designated number K should correspond at least to the number of digits of the telephone number required to make a local area call.

Here, the telephone number formula for the radio mobile telephone is different from the general telephone number formula. For example, if an operator of the radio mobile telephone unit desires to call a subscriber of a radio portable telephone, the operator of the radio mobile telephone unit has to dial a specific number (e.g., 012) that is an identification number of the radio mobile telephone, together with the telephone number. If, on the other hand, the operator of the radio mobile telephone unit desires to call a subscriber of a general telephone system, the operator of the radio mobile telephone unit has to dial the area code of the general telephone, together with the telephone number. But, in case where the radio mobile telephone and the called party's telephone are located in the same area, the caller using the radio mobile telephone unit need not to dial the area code.

Accordingly, if the number of digits of the telephone number stored in the dial buffer is equal to, or greater than a designated number K at step 317, the control unit 111 measures the time elapsed from input of present key data to input of next key data at steps 319 and 321. Thereafter, if no more telephone number is input within a given time period of time N after the input telephone number reaches the designated number K, the control unit 111 determines that input of the telephone number has completed. Here, the given time period N as contemplated by the present invention is approximately 1.5 second. Accordingly, when the number of digits of the telephone number as stored in the dial buffer of the second memory 113 reaches the designated number K, and if the input of next key data is sensed within the 1.5 second period in steps 319 and 321, the control unit 111 returns to step 313. If, however, next key data is not input until after the 1.5 second period has lapsed in steps 319 and 321, the control unit 111 determines that input of the telephone number has completed, and then proceeds to step 323 to output telephone number data stored in the dial buffer of the second memory 113 to the data processing unit 116. Then, the data processing unit 116 processes the telephone number data to the RF transmitting unit 121, and the RF transmitting unit 121 performs the automatic dialing operation by converting the telephone number into the RF signal to transmit the RF signal at step 323. After that, the control unit 111 proceeds to step 325 to perform the communication mode at step 325.

The radio mobile telephone unit as contemplated by the present invention can perform the automatic dialing operation by executing abbreviated dial mode as well as the general dial mode as mentioned above. Here, the abbreviated dial mode is executed by using an abbreviated dial table in the first memory 112, where the telephone numbers for an abbreviated dialing are previously stored. The key data input in the abbreviated dial mode generally consists of numeric key data of one or two digits. Accordingly, if the numeric key data for the abbreviated dialing is generated after an operator designates the abbreviated dial mode, the control unit 111 senses the generation of the numeric key data at step 327, and stores the abbreviated dial numeric key data received in the dial buffer of the second memory 113. Thereafter, the control unit 111 proceeds to steps 319 and 321 to determine whether a given time period N of approximately 1.5 seconds has elapsed from input of present key data to input of next key data. If key data is not received during the given time period N of approximately 1.5 seconds at steps 319 and 321 as previously described, the control unit 111 determines that input of the telephone number has been completed. Accordingly, the control unit 111 proceeds to step 323 to thereby check numeric key data being stored in the dial buffer of the second memory 113. After that, the control unit 111 accesses the telephone number stored in an area corresponding to the numeric key on the abbreviated dial table of the first memory 112 for automatically dialing the telephone number.

The key input unit 114 of the radio mobile telephone separately includes a "SEND" key for providing an operator or a caller the option to manually complete the dialing operation. Accordingly, the caller can manually forward the telephone number to the telephone network and to inform the telephone network that a connection is desired by pressing a "SEND" key after dialing a telephone number. In this case, the control unit 111 senses that the "SEND" key is pressed at step 329, and dials the telephone number stored in the dial buffer of the second memory 113 at step 331. That is, if the "SEND" key is pressed by an operator within for example, a given time period N after the telephone number of a called subscriber is input through steps 313, 315 and 317, the control unit 111 sequentially performs steps 313, 327, 329 and 331 to allow manual dialing of such a telephone number by way of "SEND" key.

Figure 4:
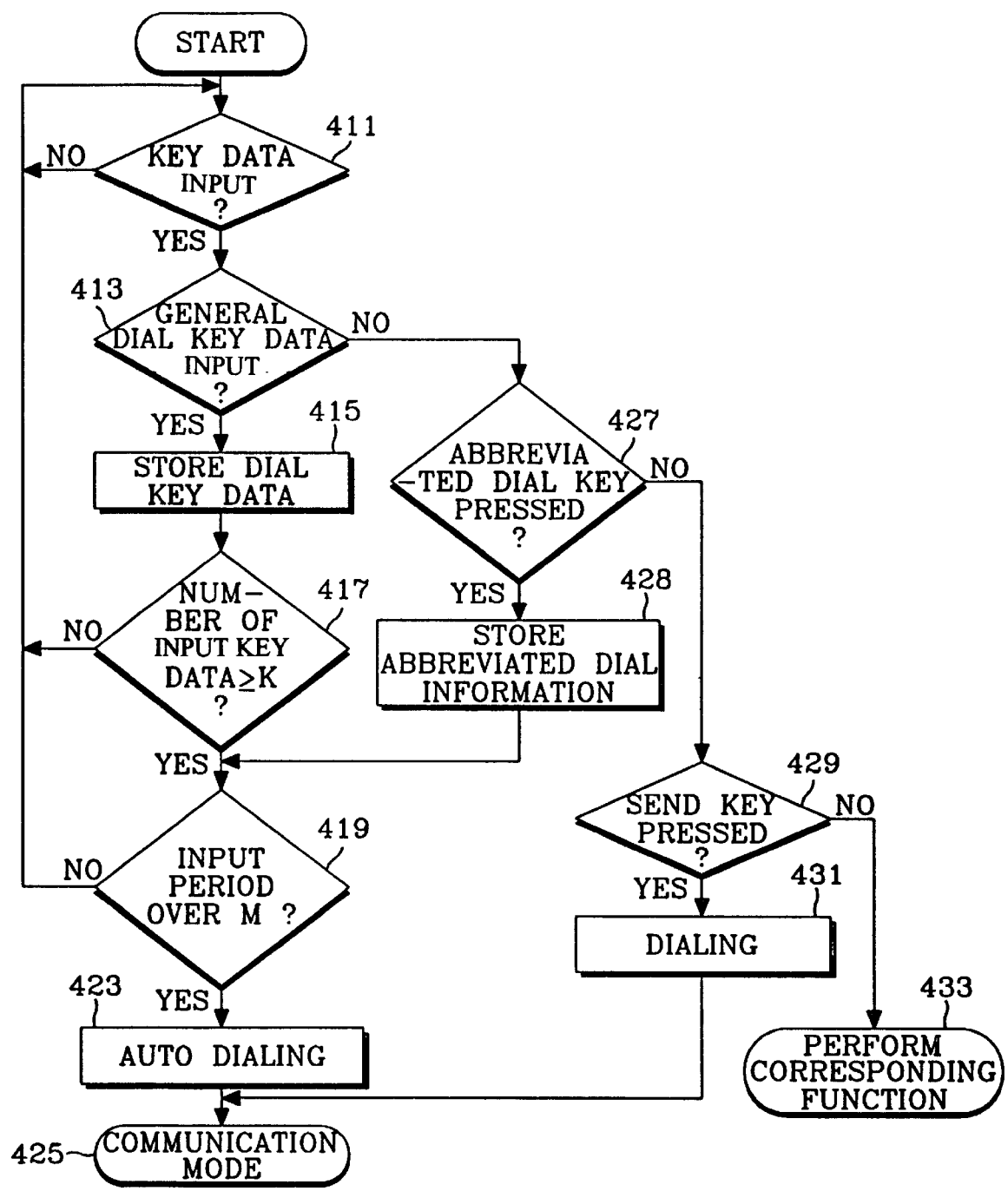
FIG. 4 is a flowchart illustrating a dialing operation of the mobile telephone unit constructed as a second embodiment of the present invention.

Referring now to FIG. 4 which illustrates an automatic dialing operation of the radio mobile telephone unit in accordance with the second embodiment of the present invention. The dialing method as performed in accordance with the second embodiment functions by detecting whether key data is input by an operator, and analyzing input key data; storing general dial key data when the result analyzed in the analyzing step indicates general dial key data, returning to the detecting step when the number of input key data is less than a designated number, and standing-by for measuring a generation time period of present key data when the number of input key data is equal to, or greater than the designated number; repeating the steps as described above by returning to the analyzing step, when the generation time period of key data is within the designated period of time, and automatically dialing the telephone number in accordance with the key data stored, when the generation time period of key data is greater than the designated period of time; storing abbreviated dial key data when the result analyzed in the analyzing step is abbreviated dial key data, returning to the inputting step when the generation time period of present key data is within the designated period of time, and automatically dialing the telephone numbers in accordance with key data stored when the generation time period of present key data is greater than the designated period of time; and automatically dialing the telephone numbers in accordance with key data stored, when "SEND" key data is input in the analyzing step.

In FIG. 4, the control unit 111 scans the key input unit 114 to detect whether key data is input by an operator. If key data is received from the key input unit 114, the control unit 111 senses input of key data at step 411 and then analyzes the input key data at step 413. If the result analyzed in the analyzing step indicates key data for performing the general dial mode, the control unit 111 proceeds to step 415 to store the input key data in a dial buffer of the second memory 113. In the general dial mode, the telephone number is input by using the numeric keys, and the control unit 111 repeats the steps as described above in order to store numeric key data of the telephone number in the dial buffer second memory 113.

After storing input numeric key data of the telephone number in the dial buffer of the second memory 113, the control unit 111 detects whether the number of digits of the telephone number stored in the dial buffer is equal to, or greater than a designated number K at step 417.

Accordingly, if the number of digits of the telephone number stored in the dial buffer is equal to, or greater than the designated number K at step 417, the control unit 111 determines whether a generation time period of present key data is greater than a designated time period M, i.e., if the caller continues to press a final key of the telephone number in order to dial until the designated time period M has lapsed, the control unit 111 determines the input key data as the final telephone number. Here, the designated time period M is designated as approximately 1.2 second to 1.5 seconds. Accordingly, if the generation time period of key data, which is input when the number of telephone number data stored in the dial buffer is equal to, or greater than the designated number K, is over 1.2 second (ie. the designated time period), the control unit 111 determines input key data as the final telephone number at step 419, and proceeds to step 423 to output telephone number data stored in the dial buffer of the second memory 113 to the data processing unit 116. Then, the data processing unit 116 processes the telephone number data to the RF transmitting unit 121, where the RF transmitting unit 121 converts the telephone number into the RF signal and performs the automatic dialing operation. Thereafter, the control unit 111 proceeds to step 425 to execute the communication mode.

Furthermore, if numeric key data for the abbreviated dialing is generated after an operator designates the abbreviated dial mode, the control unit 111 senses generation of abbreviated key data at steps 427 and 428, and stores the abbreviated dial key data corresponding to the telephone number of a called subscriber in the dial buffer of the second memory 113. Thereafter, the control unit 111 proceeds to step 419 to detect whether a generation time period of key data is greater than the designated time period M. If input period of key data is greater than the designated time period M, the control unit 111 determines input key data as the final telephone number. Then, in step 423, the control unit 111 accesses the telephone number stored in the area corresponding to the numeric key on the abbreviated dial table of the first memory 112 in order to automatically dial the accessed telephone number, after checking numeric key data stored in the dial buffer of the second memory 113.

As described previously, the key input unit 114 of the radio mobile telephone as shown in FIG. 1 also includes a "SEND" key for providing an operator the option to manually complete the dialing operation. Accordingly, the caller completes the dialing operation by using the "SEND" key after dialing the telephone number. In this case, if the control unit 111 senses that the "SEND" key is pressed at step 429, the control unit 111 dials the telephone number stored in the dial buffer of the second memory 113 at step 431.

When an operator or caller attempts to establish a telephone conversation by using the radio mobile telephone as described above, if next key data is not input or the input key data is continued beyond a designated time period, the radio mobile telephone determines that input of the telephone number has completed. In this case, the radio mobile telephone automatically dials the telephone number stored in the memory in order to efficiently and easily perform the dialing operation.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. An automatic dialing method of a mobile telephone system linked to a mobile telephone network and having a send key for enabling an operator to send an origination message to the mobile telephone network upon depression, and an abbreviated dialing memory for storing a plurality of destination telephone numbers of selected subscribers, said method comprising the steps of:

determining whether one of a telephone number of a called subscriber and an abbreviated number corresponding to the telephone number is entered by the operator;

sequentially storing the telephone number of the called subscriber in a buffer memory as each digit of the telephone number is being entered by the operator;

determining whether a predetermined time period has expired after all digits of the telephone number have been entered by the operator and sequentially stored in said buffer memory; and automatically dialing the telephone number of the called subscriber for establishing a connection to the mobile telephone network upon expiration of said predetermined time period, without depression of said send key.

2. The automatic dialing method of claim 1, further comprised of:

storing the abbreviated number corresponding to the telephone number of the called subscriber in said buffer memory, when the abbreviated number corresponding to the telephone number has been entered by the operator;

determining whether said predetermined time period has expired after all digits of the abbreviated number have been stored in said buffer memory; and accessing said abbreviated dialing memory to reproduce the telephone number of the called subscriber stored in said abbreviated dialing memory corresponding to the abbreviated number stored in said buffer memory, and automatically dialing the telephone number of the called subscriber for establishing a connection to the mobile telephone network upon expiration of said predetermined time period, without depression of said send key.

3. The automatic dialing method of claim 2, further comprised of displaying the telephone number of the called subscriber while dialing to establish a connection to the mobile telephone network.

4. An automatic dialing method of a mobile telephone system linked to a mobile telephone network and having a send key for enabling an operator to send an origination message to the mobile telephone network upon depression, and an abbreviated dialing memory for storing a plurality of destination telephone numbers of selected subscribers said method comprising the steps of:

determining whether one of a telephone number of a called subscriber and an abbreviated number corresponding to the telephone number is entered by the operator;

sequentially storing the telephone number of the called subscriber in a buffer memory as each digit of the telephone number is being entered by the operator;

determining whether a predetermined time period has expired after all digits of the telephone number have been entered by the operator and sequentially stored in said buffer memory;

automatically dialing the telephone number of the called subscriber for establishing a connection to the mobile telephone network upon expiration of said predetermined time period, without depression of said send key;

storing the abbreviated number corresponding to the telephone number of the called subscriber in said buffer memory, when the abbreviated number corresponding to the telephone number has been entered by the operator;

determining whether said predetermined time period has expired after all digits of the abbreviated number have been stored in said buffer memory;

accessing said abbreviated dialing memory to reproduce the telephone number of the called subscriber stored in said abbreviated dialing memory corresponding to the abbreviated number stored in said buffer memory, and automatically dialing the telephone number of the called subscriber for establishing a connection to the mobile telephone network upon expiration of said predetermined time period, without depression of said send key;

displaying the telephone number of the called subscriber while dialing to establish a connection to the mobile telephone network; and immediately dialing the telephone number of the called subscriber in accordance with the input key data sequentially stored in said first memory in response to depression of said send key, regardless of whether the next key data is input within said predetermined time period.

5. The automatic dialing method of claim 1, further comprised of said predetermined time period corresponding to at least 1.2 seconds but no more than 1.5 seconds.

6. A dialing method in a radio mobile telephone linked to a mobile telephone network having a first memory, a second memory for storing a plurality of destination telephone numbers of selected subscribers and abbreviated numbers corresponding to the destination telephone numbers, and a key input unit with at least a send key for enabling an operator to send an origination message to the mobile telephone network upon depression, said method comprising the steps of:

detecting whether key data is input by the operator through said key input unit, and analyzing whether the input key data indicates one of dial key data and abbreviated dial key data;

when the input key data indicates said dial key data representing each digit of a telephone number of a called subscriber, storing the input key data in said first memory;

determining whether the number of digits represented by the input key data is less than a predetermined number;

returning to detect whether next key data is input by the operator, when the number of digits input by the dial key data is less than said predetermined number;

determining whether the next key data is input within a predetermined time period when the number of digits input by the dial key data is not less than said predetermined number;

returning to detect whether additional key data is input by the operator, when the next key data is input within the predetermined time period;

automatically dialing the telephone number of the called subscriber in accordance with the input key data sequentially stored in said first memory, when the next key data is not input within the predetermined time period, without depression of said send key;

alternatively, when the input key data indicates said abbreviated dial key data representing an abbreviated number of the telephone number of said called subscriber, storing the abbreviated number corresponding to the telephone number of the called subscriber in said first memory;

determining whether the next key data is input within said predetermined time period, after the abbreviated dial key data has been stored in said first memory; and accessing said second memory to reproduce the telephone number of the called subscriber stored in said second memory corresponding to the abbreviated number stored in said first memory, and automatically dialing the telephone number of the called subscriber for establishing a connection to the mobile telephone network, when the next key data is not input within said predetermined time period, without depression of said send key.

7. The dialing method of claim 6, further comprised of dialing the telephone number of the called subscriber in accordance with the input key data sequentially stored in said first memory immediately in response to depression of said send key, regardless of whether the next key data is input within the predetermined time period.

8. The dialing method of claim 7, further comprising the steps:

storing the abbreviated number corresponding to the telephone number of the called subscriber in said first memory, when the input key data indicates an abbreviated dial key data representing the abbreviated number of the telephone number of the called subscriber;

determining whether the next key data is input within a designated time period, after the abbreviated dial key data has been stored in said first memory; and accessing said second memory to reproduce the telephone number of the called subscriber corresponding the abbreviated number stored in said second memory, and automatically dialing the telephone number of the called subscriber for establishing a connection to the mobile telephone network, when the next key data is not input within said predetermined time period.

9. The dialing method of claim 8, further comprised of displaying the telephone number of the called subscriber while dialing to establish a connection to the mobile telephone network.

10. The dialing method of claim 6, further comprised of said predetermined time period corresponding to at least 1.2 seconds but no more than 1.5 seconds.

11. The dialing method of claim 6, further comprised of immediately dialing the telephone number of the called subscriber in accordance with the input key data sequentially stored in said first memory in response to depression of said send key, regardless of whether the next key data is input within said predetermined time period.

12. A dialing method in a radio mobile telephone linked to a mobile telephone network having at least a send key for enabling an operator to send an origination message to the mobile telephone network upon depression, said method comprising the steps of:

detecting whether key data is input by the operator, and analyzing whether the input key data indicates dial key data;

storing the input key data in a first memory when the input key data indicates dial key data representing each digit of a telephone number of a called subscriber;

determining whether the number of digits represented by the input key data is less than a predetermined number;

returning to detect whether next key data is input by the operator, when the number of digits input by the dial key data is less than said predetermined number;

determining whether a generating time of current key data as input by the operator is within a predetermined time, when the number of digits input by the dial key data is not less than said predetermined number;

returning to detect whether next key data is input by the operator, when the generating time of the current key data as input by the operator is within said predetermined time; and automatically dialing the telephone number of the called subscriber in accordance with the input key data sequentially stored in said first memory, without depression of said send key, when the generating time of the current key data is not within said predetermined time.

13. The dialing method of claim 12, further comprised of said radio mobile telephone containing a second memory for storing a plurality of destination telephone numbers of selected subscribers and abbreviated numbers corresponding to the destination telephone numbers.

14. The dialing method of claim 13, further comprising the steps:

storing the abbreviated number corresponding to the telephone number of the called subscriber stored in said first memory, when the input key data indicates an abbreviated dial key data representing the abbreviated number of the telephone number of the called subscriber;

determining whether a generating time of the current key data is within said predetermined time, after the abbreviated dial key data has been stored in said first memory; and accessing said second memory to reproduce the telephone number of the called subscriber stored in said second memory corresponding to the abbreviated number stored in said first memory, and automatically dialing the telephone number of the called subscriber for establishing a connection to the mobile telephone network, without depression of said send key, when the generating time of the current key data is not within said predetermined time.

15. The dialing method of claim 12, further comprised of displaying the telephone number of the called subscriber while dialing to establish a connection to the mobile telephone network.

16. The dialing method of claim 15, further comprised of said predetermined time period corresponding to at least 1.2 seconds but no more than 1.5 seconds.

17. A mobile telephone system linked to a mobile telephone network, comprising:

a first memory;

a second memory storing pre-registered telephone numbers of selected subscribers and abbreviated numbers corresponding to the telephone numbers;

a key input unit having a keypad for allowing an operator to input telephone numbers, abbreviated numbers corresponding to the telephone numbers, and at least a send key for enabling the operator to send an origination message to the mobile telephone network upon depression and;

a display unit for displaying the telephone numbers and the abbreviated numbers input by the operator;

a controller for controlling an automatic dialing of the mobile telephone system by:

determining whether one of a telephone number of a called subscriber and an abbreviated number corresponding to the telephone number is entered by the operator;

sequentially storing the telephone number of the called subscriber in said first memory as each digit of the telephone number is being entered by the operator;

determining whether a predetermined time period has expired after all digits of the telephone number have been entered by the operator and sequentially stored in said first memory; and automatically dialing the telephone number of the called subscriber for establishing a connection to the mobile telephone network upon expiration of the predetermined time period, without depression of said send key.

18. The mobile telephone system of claim 17, further comprised of said controller further:

storing the abbreviated number corresponding to the telephone number of the called subscriber in said first memory, when the abbreviated number corresponding to the telephone number has been entered by the operator;

determining whether said predetermined time period has expired after all digits of the abbreviated number have been stored in said first memory; and accessing said second memory to reproduce the telephone number of the called subscriber stored in said second memory corresponding to the abbreviated number stored in said first memory, and automatically dialing the telephone number of the called subscriber for establishing a connection to the mobile telephone network upon expiration of said predetermined time period, without depression of said send key.

19. The mobile telephone system of claim 18, further comprised of immediately dialing the telephone number of the called subscriber in accordance with the input key data sequentially stored in said first memory in response to depression of said send key, regardless of whether the next key data is input within said predetermined time period.

20. The mobile telephone system of claim 17, further comprised of said predetermined time period corresponding to at least 1.2 seconds but no more than 1.5 seconds.

* * * * *